(12) United States Patent
Rook et al.

(10) Patent No.: US 11,174,969 B2
(45) Date of Patent: Nov. 16, 2021

(54) THREADED CONNECTION OF A DUCT

(71) Applicant: THE BOEING COMPANY, Chicago, IL (US)

(72) Inventors: Micah T. Rook, Charleston, SC (US); Daniel S. Thomas, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 385 days.

(21) Appl. No.: 16/249,394

(22) Filed: Jan. 16, 2019

(65) Prior Publication Data
US 2020/0224802 A1 Jul. 16, 2020

(51) Int. Cl.
*F16L 15/06* (2006.01)

(52) U.S. Cl.
CPC .................... *F16L 15/06* (2013.01)

(58) Field of Classification Search
CPC ............ F16L 15/06; F16L 15/08; F16L 43/02
USPC ........................................................... 285/92
See application file for complete search history.

(56) References Cited

U.S. PATENT DOCUMENTS

| | | | | |
|---|---|---|---|---|
| 1,904,675 A * | 4/1933 | Boyer | ............... | F16L 15/06 285/390 |
| 2,140,467 A * | 12/1938 | Cargile | ............... | F16L 15/08 285/40 |
| 2,418,418 A * | 4/1947 | Martin | ............... | B64C 11/04 416/209 |
| 2,754,871 A | 7/1956 | Stoll | | |
| 2,827,313 A * | 3/1958 | Conner | ............... | F16L 15/08 285/94 |
| 3,062,568 A * | 11/1962 | Andresen | ............... | F16L 15/001 285/333 |
| 3,813,115 A * | 5/1974 | French | ............... | F16L 37/252 285/92 |
| 4,004,832 A * | 1/1977 | Connelly | ............... | E21B 17/08 285/333 |
| 4,174,858 A * | 11/1979 | Brooks | ............... | A47L 9/242 285/239 |
| 5,083,890 A * | 1/1992 | Gabilondo | ............... | F16L 15/08 411/411 |
| 5,101,906 A * | 4/1992 | Carlin | ............... | E21B 17/043 285/92 |
| 5,520,422 A * | 5/1996 | Friedrich | ............... | F16L 15/08 285/296.1 |
| 5,906,398 A * | 5/1999 | Larsen | ............... | F16L 15/08 285/24 |
| 6,419,147 B1 * | 7/2002 | Daniel | ............... | B23K 1/0008 228/194 |

(Continued)

FOREIGN PATENT DOCUMENTS

WO  WO-2019132573 A1 * 7/2019 ............ F16L 19/005

*Primary Examiner* — David Bochna
(74) *Attorney, Agent, or Firm* — Patterson + Sheridan, LLP

(57) ABSTRACT

A pin member of threaded connection includes a body and a male thread positioned on the body. The male thread includes a male thread principal portion, a male thread transition portion with a cross-sectional area that is smaller than a cross-sectional area of the male thread principal portion, and a male thread protrusion with a cross-sectional area that is larger than the cross-sectional area of the male thread transition portion with the male thread transition portion positioned between the male thread principal portion and the male thread protrusion.

20 Claims, 6 Drawing Sheets

(56) References Cited

U.S. PATENT DOCUMENTS

| | | | |
|---|---|---|---|
| 6,447,227 B1* | 9/2002 | Crutchley | F16B 19/10 |
| | | | 411/178 |
| 6,685,236 B2* | 2/2004 | Setterberg, Jr. | E21B 17/08 |
| | | | 166/207 |
| 6,908,121 B2* | 6/2005 | Mirth | F16L 15/08 |
| | | | 285/92 |
| 7,793,989 B2* | 9/2010 | Pinckney, Jr. | F16L 19/02 |
| | | | 285/92 |
| 9,617,800 B2* | 4/2017 | Zijsling | F16L 15/001 |
| 2006/0012173 A1* | 1/2006 | Pinckney, Jr. | F16L 15/006 |
| | | | 285/386 |
| 2006/0033333 A1 | 2/2006 | Pickney | |

* cited by examiner

THREADED CONNECTION OF A DUCT

TECHNICAL FIELD

Examples of the present disclosure relate to a threaded connection, such as for use within a duct, particularly in an airplane.

BACKGROUND

An aircraft typically includes multiple types of equipment inside an upper fuselage segment of the aircraft, such as various systems, equipment, furnishings, and linings. These various systems, equipment, furnishings, and linings may include, for example, electrical equipment, wires, environmental control system (ECS) equipment and ducts, oxygen lines, water lines, power feeders, cabin ceiling panels, and other items. Typically, one or more secondary structures attached to the airframe provide support for these various systems, equipment, furnishings, and linings inside the upper fuselage segment. Further, the structures and equipment are designed and manufactured to fit tightly within the upper fuselage to avoid unused space. Thus, the equipment and components are designed to fit together in a certain configuration and assembled in a particular sequence to maximize the utility of the space. For the ECS ducts, the ducts are assembled using multiple segments connected to each other with connectors. The segments and connectors often include angled portions, such as 90 degree bends, that are placed at angles with respect to other segments. A minor misalignment for these angled portions may be manageable, but often the minor misalignment propagates to a large misalignment as the size of the ECS duct system increases. Accordingly, what may be needed are connectors and duct systems that are easily and repeatably alignable with each other, such as for use within the confined spaces of the fuselage of an aircraft.

SUMMARY

The systems, methods, apparatus, and devices of the disclosure have several examples, no single one of which is solely responsible for its attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a threaded connection, particularly for use within a duct system of a fuselage.

In one example, a threaded connection is disclosed. The threaded connection includes a pin member with a male thread and a box member with a female thread corresponding to the male thread. The male thread includes a male thread principal portion, a male thread transition portion with a cross-sectional area that is smaller than a cross-sectional area of the male thread principal portion, and a male thread protrusion with a cross-sectional area that is larger than the cross-sectional area of the male thread transition portion with the male thread transition portion positioned between the male thread principal portion and the male thread protrusion. The female thread includes a female thread principal portion, a female thread transition portion with a cross-sectional area that is smaller than a cross-sectional area of the female thread principal portion, and a female thread cavity with a cross-sectional area that is larger than the cross-sectional area of the female thread transition portion with the female thread transition portion positioned between the female thread principal portion and the female thread cavity.

In another example, a pin member of a threaded connection is disclosed. The pin member includes a body and a male thread positioned on the body. The male thread includes a male thread principal portion, a male thread transition portion with a cross-sectional area that is smaller than a cross-sectional area of the male thread principal portion, and a male thread protrusion with a cross-sectional area that is larger than the cross-sectional area of the male thread transition portion with the male thread transition portion positioned between the male thread principal portion and the male thread protrusion.

In another example, a duct of an environmental control system is disclosed. The duct includes a plurality of threaded connections to connect a plurality of segments, in which each threaded connection includes a pin member having a male thread. The male thread includes a male thread principal portion, a male thread transition portion with a cross-sectional area that is smaller than a cross-sectional area of the male thread principal portion, and a male thread protrusion with a cross-sectional area that is larger than the cross-sectional area of the male thread transition portion with the male thread transition portion positioned between the male thread principal portion and the male thread protrusion.

Examples generally include methods, apparatus, and systems, as substantially described herein with reference to and as illustrated by the accompanying drawings. Numerous other examples are provided.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and equivalents thereof.

BRIEF DESCRIPTION OF ILLUSTRATIONS

So that the manner in which the above-recited features of the present disclosure can be understood in detail, a more particular description, briefly summarized above, may be had by reference to examples, some of which are illustrated in the appended drawings. It is to be noted, however, that the appended drawings illustrate only certain examples of this disclosure and are therefore not to be considered limiting of scope, for the description may admit to other equally effective examples.

To facilitate understanding, identical reference numerals have been used, where possible, to designate identical elements that are common to the figures. It is contemplated that elements described in one example may be beneficially utilized on other examples without specific recitation.

DETAILED DESCRIPTION

Figure 1:
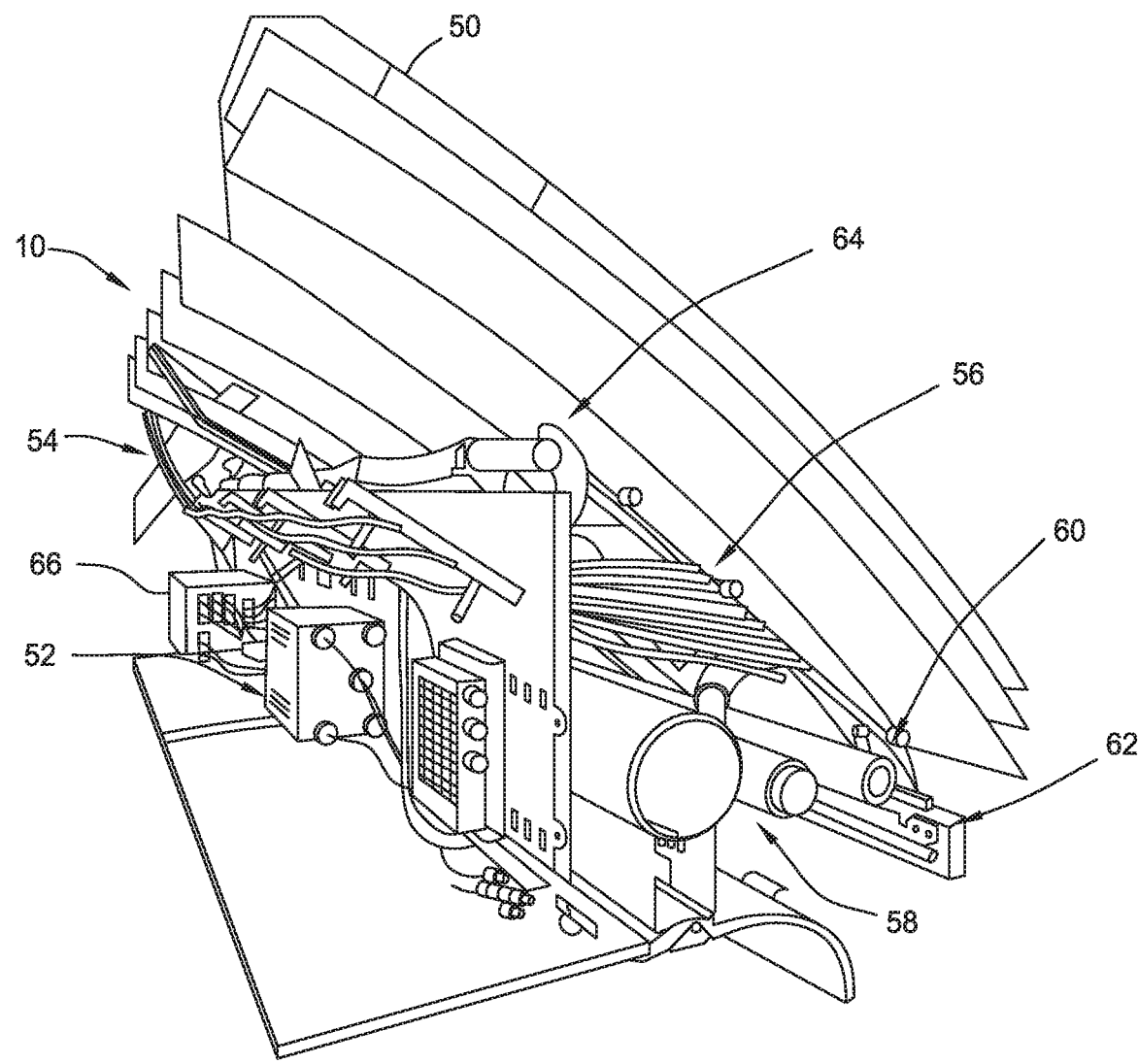
FIG. 1 is a perspective view of equipment included within an aircraft in accordance with one or more examples of the present disclosure.

Examples of the present disclosure provide apparatus, systems, and methods, for a threaded connection, such as of a duct used within an airplane.

In the following, reference is made to examples presented in the present disclosure. However, the scope of the present disclosure is not limited to specific described examples. Instead, any combination of the following features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the following examples, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As shown and described herein, various features of the disclosure will be presented. Various examples may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various examples will be described and various features may include changes, alterations, modifications, etc. as will be appreciated by those of skill in the art, whether explicitly described or otherwise would be appreciated by those of skill in the art.

Ducts, or a duct system or ductwork, refers to conduits or passages that are used deliver or remove air, such as supply air, return air, or exhaust air. Ducts are included within multiple types of environments, such as within an airplane, to provide or remove air as desired to different components of the airplane. The present disclosure relates to threaded connections that may be used, for example, within ducts for aligning segments with respect to each other. The threaded connection includes a pin member having a male thread and a box member having a female thread. The pin member fits within the box member with the pin member and the box member rotated with respect to each other for the male thread to engage the female thread. Upon make-up of the male thread with the female thread, a protrusion of the male thread is positioned or received within a cavity of the female thread to indicate a selected relative position of the pin member with the box member. As used herein, "make-up" refers to threading a pin member and a box member together, and "selected make-up" refers to threading the pin member and the box member together until a relative position (axial or circumferential) of the pin member with the box member is reached.

FIG. 1 is a perspective view of equipment included within an aircraft in accordance with one or more examples of the present disclosure. In particular, a support system 10 is shown that has been attached to a frame 50 (e.g., fuselage) of an aircraft to support various aircraft equipment and also variable configurations of the equipment within the aircraft. For example, the support system 10 is shown as supporting electrical equipment 52, a first bundle 54 of wires, and a second bundle 56 of wires. Further, the support system 10 is supporting ECS components, such as an ECS duct 58 and ECS gasper 60. Still further, the support system 10 is supporting an oxygen line 62, a water line 64, and a power feeder 66. Thus, multiple components and systems are included within the frame 50 of the aircraft.

The ECS duct 58 is formed from multiple tubular segments that are coupled to each other through threaded connections, according to the present disclosure. The segments of the ECS duct 58, when coupled to each other, form conduits or passages to provide air throughout the aircraft. The present disclosure relates to threaded connections that may be used to align segments with respect to each other, such as the segments of the ECS duct 58, and thus facilitate assembly of the ECS duct 58 within the aircraft.

While FIG. 1 is described with respect to an airplane, it is contemplated that examples herein are applicable to vehicles other than airplanes. Moreover, it is contemplated that examples herein may be applied to non-vehicular applications, such as any application where a threaded connection may be utilized.

Figure 2:
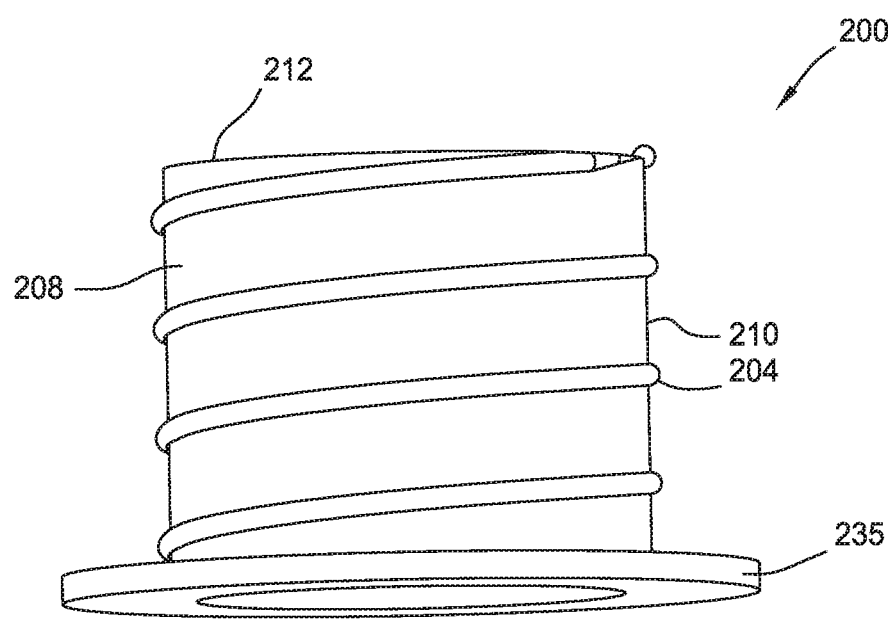
FIG. 2 is a perspective view of a pin member in accordance with one or more examples of the present disclosure.
Figure 3:
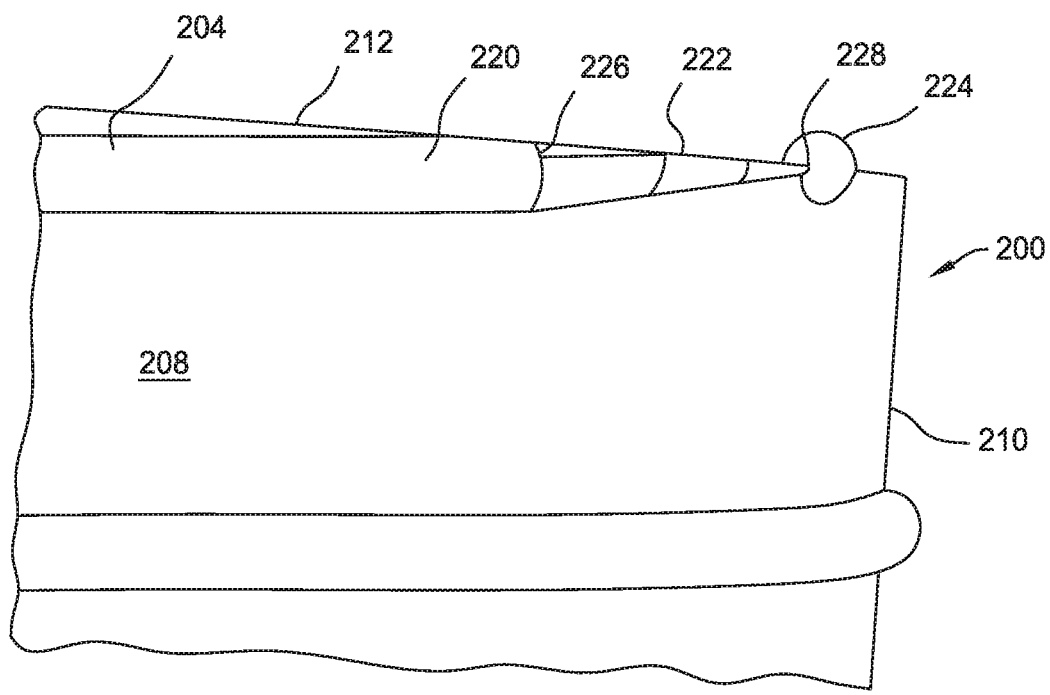
FIG. 3 is a detailed view of a pin member in accordance with one or more examples of the present disclosure.
Figure 4A:
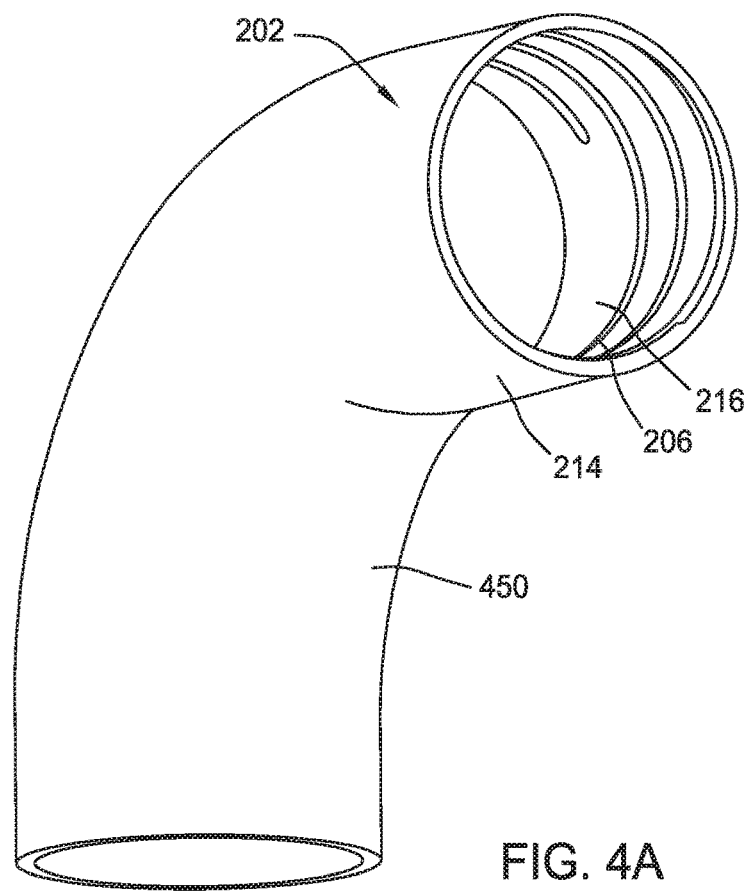
FIG. 4A is a perspective view of a box member in accordance with one or more examples of the present disclosure.
Figure 5:
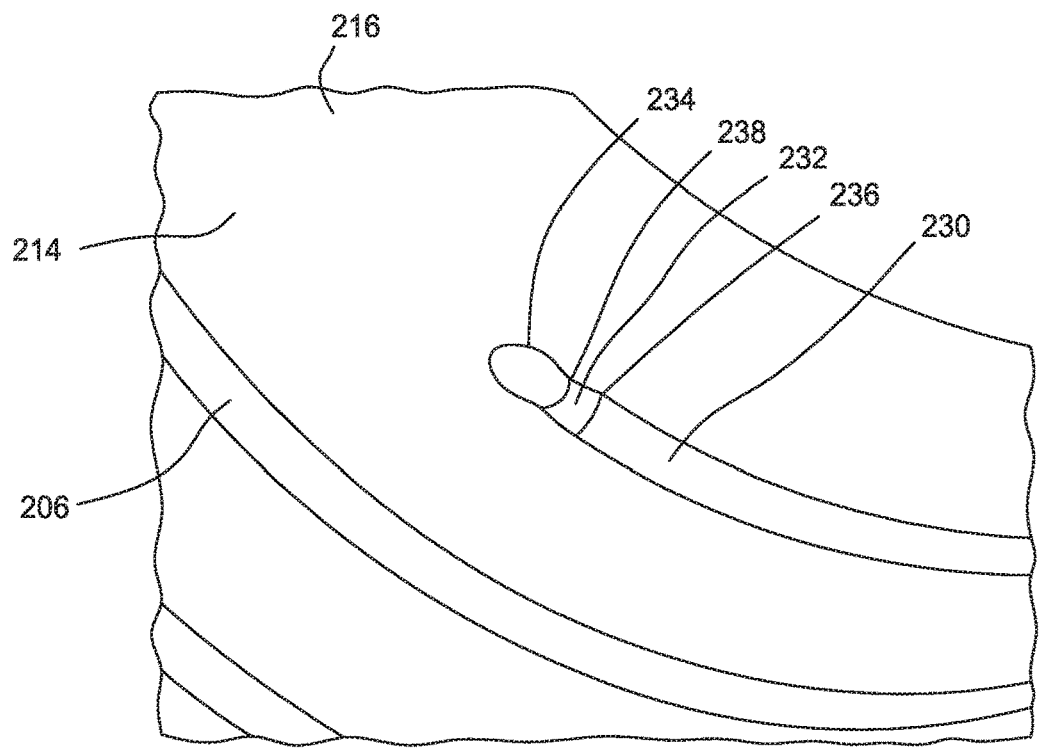
FIG. 5 is a detailed view of a box member in accordance with one or more examples of the present disclosure.

Referring now to FIGS. 2-5, multiple views of a threaded connection in accordance with one or more examples of the present disclosure are shown. In particular, FIG. 2 shows a perspective view of a pin member 200. FIG. 3 shows a detailed view of the pin member 200. FIG. 4 shows a perspective view of a box member 202. FIG. 5 shows a detailed view of the box member 202. The threaded connection includes the pin member 200 and the box member 202 with the pin member 200 including a male thread 204 formed thereon and the box member 202 having a female thread 206 formed therein. The male thread 204 and the female thread 206 correspond to each other such that, as the pin member 200 and the box member 202 are rotated with respect to each other, the male thread 204 and the female thread 206 engage and make-up against each other.

The pin member 200 includes a body 208, such as a cylindrical body, with the male thread 204 positioned or formed on an outer surface 210 (e.g., cylindrical outer surface) of the body 208. Thus, the male thread 204 protrudes and extends out and above the outer surface 210 of the body 208. The body 208 may also include other shapes or surface, such as by including a tapered or frusto-conical shape or outer surface without departing from the scope of the present disclosure. The body 208 has an end 212 that defines a shoulder for the pin member 200. In one or more examples, a portion of the male thread 204 may extend past the shoulder (discussed more below), as shown. In some examples, the pin member 200 includes an optional flange 235, which may be used to facilitate coupling to other objects. In some examples, which may be combined with other examples herein, the flange 235 is omitted.

The box member 202 (shown in FIG. 4A) includes a body 214, such as a cylindrical body, with the female thread 206 positioned or formed within an inner surface 216 (e.g., cylindrical inner surface) of the body 214. Thus, the female thread 206 is formed and extends into the inner surface 216 of the body 214. The box member 202 is illustrated as coupled to an elbow 450 for illustrative purposes, but it is contemplated that the box member 202 may be coupled to other features, or that the box member 202 may be a standalone object. In some examples, the box member 202 is formed integrally with the elbow 450. In other examples, the box member 202 is coupled to the elbow 450 using an adhesive or by welding, including sonic welding.

Figure 4B:
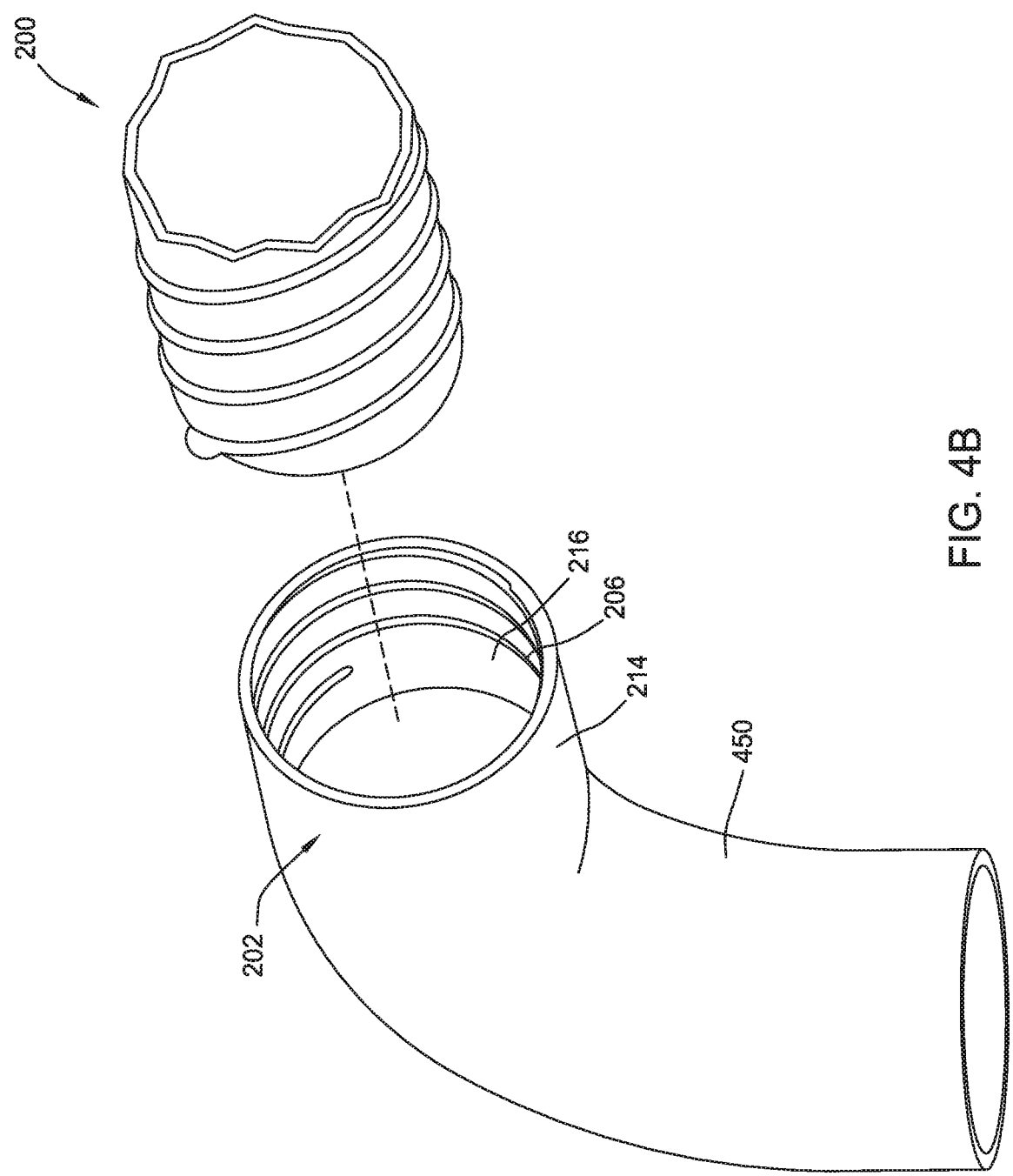
FIG. 4B is a perspective exploded view of a box member and pin member in accordance with one or more examples of the present disclosure.

As with the body 208 of the pin member 200, the body 214 of the box member 202 may also include other shapes or surface, such as by including a tapered or frusto-conical shape or outer surface without departing from the scope of the present disclosure. The body 208 of the pin member 200 and the body 214 of the box member 202 are sized such that the pin member 200 is able to fit and be positioned within the box member 202. Thus, in one example, if the bodies 208 and 214 are cylindrical, the outer diameter of the body 208 of the pin member 200 is the same or slightly smaller than the inner diameter of the body 214 of the box member 202. FIG. 4B is a perspective exploded view of a box member 202 and pin member 200 prior to make-up, in accordance with one or more examples of the present disclosure. As noted above the, the box member 202 is illustrated as coupled to a member, such as elbow 450. Similarly, the pin member 200 may also be coupled to a member, such as an elbow, a linear tubular member, or other duct member, to facilitate make-up of a duct system, such as that illustrated FIG. 1. It is contemplated that duct members may be coupled to the pin member 200 and the box member 202 prior to make up between the pin member 200 and the box member 202, or subsequent to make-up between the pin member 200 and the box member 202

The male thread 204 and the female thread 206 may correspond to each other and have complementing portions to facilitate alignment, engagement, and make-up with each other. In particular, the male thread 204 may include a principal portion 220, a transition portion 222, and/or a protrusion 224. The transition portion 222 is positioned between the principal portion 220 and the protrusion 224 along the male thread 204. For example, the transition portion 222 is positioned at an end 226 of the principal portion 220 of the male thread 204, and the protrusion 224 is positioned at an end 228 of the transition portion 222 of the male thread 204. Further, in one or more examples, the protrusion 224 may be positioned at or to extend above the end 212 that defines a shoulder.

Similarly, with reference to FIG. 5, the female thread 206 may include a principal portion 230, a transition portion 232, and/or a cavity 234. The transition portion 232 is positioned between the principal portion 230 and the cavity 234 along the female thread 206. For example, the transition portion 232 is positioned at an end 236 of the principal portion 230 of the female thread 206, and the cavity 234 is positioned at an end 238 of the transition portion 232 of the female thread 206.

The portions of male thread 204 and the female thread 206 correspond with each other to facilitate make-up and alignment of the pin member 200 with the box member 202. In particular, the principal portion 220 of the male thread 204 corresponds to and complements the principal portion 230 of the female thread 206 such that, upon make-up, the principal portion 220 of the male thread 204 is positioned within and engages the principal portion 230 of the female thread 206. Thus, the male thread principal portion 220 and the female thread principal portion 230 facilitate coupling between the pin member 200 and the box member 202. The transition portion 222 of the male thread 204 corresponds to and complements the transition portion 232 of the female thread 206 such that, upon make-up, the transition portion 222 of the male thread 204 is positioned within and engages the transition portion 232 of the female thread 206. In one example, the transition portions 222 and 232 may be formed as tapered portions that may gradually reduce in size, as shown, or have other shapes and sizes. The transition portions 222 and 232 facilitate audible clicking noises during coupling and decoupling of the pin member 200 with the box member 202, for example, as the protrusion 224 passes through the transition portion 232. Additionally, the transition portion 232 creates an area of increased resistance while protrusion 224 passes therethrough during make-up, thereby providing a more tactile engagement. Moreover, the increased resistance decreases the likelihood of inadvertent disengagement once the pin member 200 and the box member 202 are completely threaded together. Further, the protrusion 224 of the male thread 204 corresponds to and complements the cavity 234 of the female thread 206 such that, upon make-up, the protrusion 224 of the male thread 204 is positioned within and engages the cavity 234 of the female thread 206. In one example, as shown, the protrusion 224 may be formed as a ball, and the cavity 234 may be formed as a socket, such that the ball is able to fit within the socket. Insertion of the protrusion 224 into the cavity 234 provides a tactile indication of a desired make-up between the pin member 200 and the box member 202. In addition, insertion of the protrusion 224 into the cavity 234 provides indicates to a user a desired orientation between the pin member 200 and the box member 202 has been achieved, signaling a desired make-up.

Figure 8:
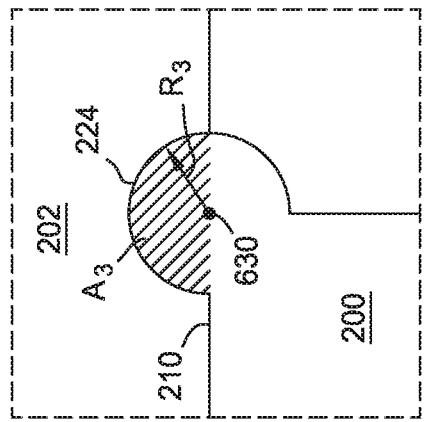
FIG. 8 is a cross-sectional view of a protrusion of a male thread positioned within and engaged with a cavity of a female thread in accordance with one or more examples of the present disclosure.
Figure 7:
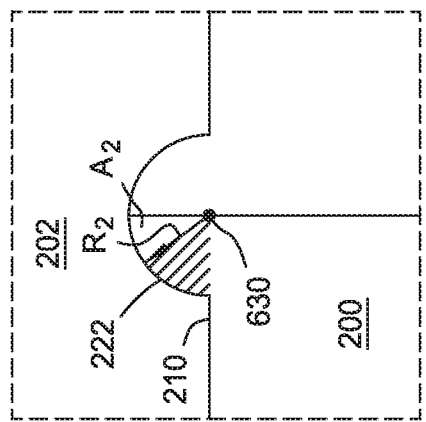
FIG. 7 is a cross-sectional view of a transition portion of a male thread positioned within and engaged with a transition portion of a female thread in accordance with one or more examples of the present disclosure.
Figure 6:
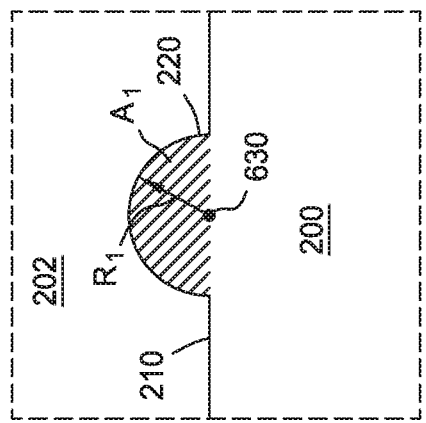
FIG. 6 is a cross-sectional view of a principal portion of a male thread positioned within and engaged with a principal portion of a female thread in accordance with one or more examples of the present disclosure.

Referring now to FIGS. 6-8, multiple cross-sectional views of the male thread 204 and the female thread 206 made-up and engaged with each other in accordance with one or more examples of the present disclosure are shown. In particular, FIG. 6 shows a cross-sectional view of the principal portion 220 of the male thread 204 positioned within and engaged with the principal portion 230 of the female thread 206. FIG. 7 shows a cross-sectional view of the transition portion 222 of the male thread 204 positioned within and engaged with the transition portion 232 of the female thread 206. Further, FIG. 8 shows a cross-sectional view of the protrusion 224 of the male thread 204 positioned within and engaged the cavity 234 of the female thread 206.

FIG. 6 shows a cross-sectional area $A_1$ of the principal portion 220 of the male thread 204, which is hatched, to represent an area of the principal portion 220 that extends above the outer surface 210 of the pin member 200. The cross-sectional area $A_1$ also represents an area of the principal portion 230 of the female thread 206 that extends below or into the inner surface 216 of the box member 202. Similarly, FIG. 7 shows a cross-sectional area $A_2$ of the transition portion 222 of the male thread 204, which is hatched, to represent an area of the transition portion 222 that extends above the outer surface 210 of the pin member 200. The cross-sectional area $A_2$ also represents an area of the transition portion 232 of the female thread 206 that extends below or into the inner surface 216 of the box member 202. Further, FIG. 8 shows a cross-sectional area $A_3$ of the protrusion 224 of the male thread 204, which is hatched, to represent an area of the protrusion 224 that extends above the outer surface 210 of the pin member 200. The cross-sectional area $A_3$ also represents an area of the cavity 234 of the female thread 206 that extends below or into the inner surface 216 of the box member 202.

In one or more examples, a size or dimension of the transition portion 222 of the male thread 204 (such as cross-sectional area) may be smaller than a corresponding size or dimension of the principal portion 220 of the male thread 204, and a size or dimension of the protrusion 224 of the male thread 204 may be larger than a corresponding size or dimension of the transition portion 222 of the male thread 204. Similarly, a size or dimension of the transition portion 232 of the female thread 206 may be smaller than a corresponding size or dimension of the principal portion 230 of the female thread 206, and a size or dimension of the cavity 234 of the female thread 206 is larger than a corresponding size or dimension of the transition portion 232 of the female thread 206.

For example, the cross-sectional area $A_2$ of the transition portion 222 of the male thread 204 (such as a cross-sectional area perpendicular to an axis 630 of the male thread 204) is smaller than the cross-sectional area $A_1$ of the principal portion 220 of the male thread 204. The cross-sectional area $A_3$ of the protrusion 224 of the male thread 204 (such as a cross-sectional area perpendicular to the axis 630) is larger than the cross-sectional area $A_2$ of the transition portion 222 of the male thread 204. By having these sizes and dimensions for the portions of the male thread 204 and the female thread 206, the protrusion 224 may be able to indicate and click in place when the protrusion 224 is received within and engages the cavity 234 of the female thread 206, thereby indicating that a predetermined make-up and relative position of the pin member 200 and the box member 202 is reached.

Further, in one or more examples, a size or dimension of the principal portion 220 of the male thread 204 may be the same or similar as a size or dimension of the protrusion 224 of the male thread 204. For example, the cross-sectional area $A_3$ of the protrusion 224 of the male thread 204 (such as a cross-sectional area perpendicular to the axis 630) may be the same or similar as the cross-sectional area $A_1$ of the principal portion 220 of the male thread 204. Similarly, a size or dimension of the principal portion 230 of the female thread 206 may be the same or similar as a size or dimension of the cavity 234 of the female thread 206. By having these sizes and dimensions for the portions of the male thread 204 and the female thread 206, the protrusion 224 may be able to pass through the principal portion 230 of the female thread 206 to enable the pin member 200 and the box member 202 to be made up without interference, but still enabling the click and indication fit of the protrusion 224 within the cavity 234.

For example, the cross-sectional area A1 may be selected to allow the protrusion 224, having a cross-sectional area A3, to pass through the female thread principal portion 220 relatively easily to promote threading/make-up of a pin member 200 into the box member 202. The cross sectional area of the female thread transition portion 232 has a reduced cross-sectional area compared to the cross-sectional area of the protrusion 224 to create a region of increased threading resistance, resulting in a tactile and/or audible indicating during make-up. The cavity 234 includes an increased cross-sectional area compared to the female thread transition portion 232 such that user receives a tactile indication as the protrusion 224 passes through the female thread transition portion 232 and into the cavity 234.

Referring still to FIGS. 6-8, the male thread 204 and the female thread 206 are shown as having a semi-circular cross-sectional shape. However, the present disclosure is not so limited, as other cross-sectional shapes, such as rectangular, triangular, tapered, and/or dove-tail, may be used for some or all of the portions of the male thread 204 and/or the female thread 206 in accordance with one or more examples of the present disclosure. As the male thread 204 and the female thread 206 have a semi-circular cross-sectional shape, the principal portion 220 of the male thread 204 and the principal portion 230 of the female thread 206 are defined with a radius $R_1$, extending from the axis 630. Similarly, the transition portion 222 of the male thread 204 and the transition portion 232 of the female thread 206 are defined with a radius $R_2$, also extending from the axis 630, and the protrusion 224 of the male thread 204 and the cavity 234 of the female thread 206 are defined with a radius $R_3$, also extending from the axis 630.

As with the above discussion with respect to the size and dimensions of the male thread 204 and the female thread 206, the radius $R_2$ of the transition portion 222 may be smaller than the radius $R_1$ of the principal portion 220 of the male thread 204, and the radius $R_3$ of the protrusion 224 may be larger than the radius $R_2$ of the transition portion 222 of the male thread 204. Further, the radius $R_3$ of the protrusion 224 may be the same or similar as the radius $R_1$ of the principal portion 220 of the male thread 204.

In FIGS. 2-8, the pin member 200 is shown as having a single male thread 204, and the box member 202 is shown as having a single female thread 206. However, the present disclosure is not so limited, as the pin member 200 and the box member 202 may have multiple corresponding threads. In such an example, the multiple threads may be asymmetrically offset from each other. For example, if four male threads are included on the pin member 200, the male threads may be asymmetrically offset about the axis of the pin member 200 (e.g., not oriented at 90 degrees from each other) such that the pin member 200 and the box member 202 cannot have multiple different starts. This may prevent the pin member 200 and the box member 202 from having multiple potential rotational orientations with respect to each other upon make-up. Further, one or more seals may be included within the threaded connection, such as positioned between the pin member 200 and the box member 202. In one example, an o-ring may be included within a groove formed within the pin member 200 or the box member 202 to facilitate sealing the threaded connection upon make-up.

Figure 9:
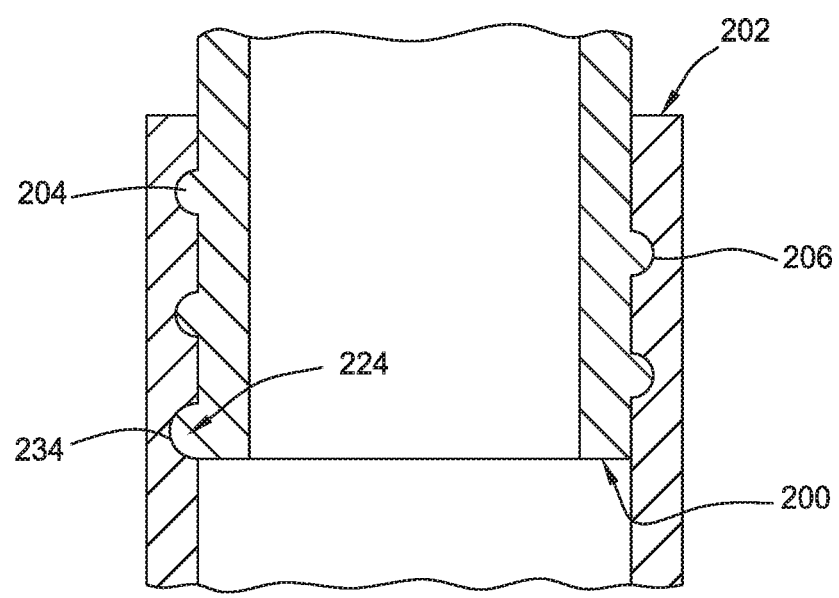
FIG. 9 is a cross-sectional view of a pin member and box member coupled together in a threaded connection in accordance with one or more examples of the present disclosure.

FIG. 9 illustrates one example of pin member 200 and box member 202 coupled together via a threaded connection. The pin member 200 is threaded into the box member 202 such that the male threads 204 of the pin member 200 engage the female threads 206 of the box member. The pin member 200 is threaded into the box member 202 until a protrusion 204 of the pin member engages a cavity 234 of the box member, indicating a desired make-up configuration between the pin member 200 and the box member 202.

The male thread and the female thread may have one or more different pitches or ratios in accordance with the present disclosure. For example, the outer diameter of the threaded connection may be about twice, or more, than a pitch of the male thread and the female thread. In one example, if the outer diameter of the threaded connection is about 2 inches, the pitch of the male and female threads may be about 1 inch. However, the present disclosure is no so limited, as other diameters, pitches, and ratios therebetween may be used without departing from the present disclosure.

A threaded connection in accordance with the present disclosure may be included within a duct, such as within an airplane. For example, the duct may include the threaded connection to facilitate rotational orientation of one duct segment to the next duct segment. The threaded connections that may be used to align the segments with respect to each other, and thus facilitate assembly of the ducts within the aircraft. Further, a threaded connection may be formed using one or more different materials or methods. In one example, the threaded connection may be formed from, metals, metal alloys, plastic and/or composite materials, such as fiberglass. A mold may be manufactured for the threaded connection of the pin member and the box member, and fiberglass and epoxy may be used to form the threaded connection with the above described threads.

While examples herein are described with respect to ducts, it is contemplated that examples herein may be applicable to other threaded and/or tubular members, including piping, conduits, and the like, which may be used to transport fluids such as liquids or gases, as well as housing for wiring or other electrical components.

The threaded members disclosed herein may be retrofitted and/or coupled to premanufactured duct members in a predetermined orientation. Additionally or alternatively, the threaded members disclosed herein may be integrally formed into duct members during manufacturing of the duct members, such that duct members couple to one another in a predetermined orientation.

While the present disclosure has been described in detail in connection with only a limited number of examples, it should be readily understood that the present disclosure is not limited to such described examples. Rather, the present disclosure can be modified to incorporate any number of variations, alterations, substitutions, combinations, sub-combinations, or equivalent arrangements not heretofore described, but which are commensurate with the scope of the present disclosure. Additionally, while various examples of the present disclosure have been described, it is to be understood that examples of the present disclosure may include only some of the described examples.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The use of directional terms such as above, below, upper, lower, upward, downward, top, bottom, left, right, and the like are used in relation to the illustrative examples as depicted in the figures, the upward direction being toward the top of the corresponding figure and the downward direction being toward the bottom of the corresponding figure. However, these terms are not used to be limiting, and instead are only used for descriptive purposes with reference to the drawings, as the drawings and the examples described herein may be reoriented without departing from the scope of the present disclosure.

The term "about" and "substantially" is intended to include the degree of error or uncertainty associated with measurement of the particular quantity based upon the equipment available at the time of filing the application. For example, "about" and "substantially" can include a range of ±8% or 5%, or 2% of a given value.

Therefore, it is intended that the present disclosure not be limited to the particular examples described as the best mode contemplated for carrying out this present disclosure, but that the present disclosure will include all examples falling within the scope of the claims.

What is claimed is:

1. A connection, comprising:
a pin member comprising a cylindrical body and a male thread, wherein the male thread is formed on an outer surface of the cylindrical body, the male thread comprising:
a male thread principal portion;
a male thread transition portion comprising a first cross-sectional area that is smaller than a second cross-sectional area of the male thread principal portion; and
a male thread protrusion comprising a third cross-sectional area that is larger than the first cross-sectional area of the male thread transition portion with the male thread transition portion positioned between the male thread principal portion and the male thread protrusion, wherein the cylindrical body defines a shoulder at an end thereof with the male thread protrusion positioned at the shoulder; and
a box member comprising a female thread corresponding to the male thread, the female thread comprising:
a female thread principal portion;
a female thread transition portion comprising a fourth cross-sectional area that is smaller than a fifth cross-sectional area of the female thread principal portion; and
a female thread cavity comprising a sixth cross-sectional area that is larger than the fourth cross-sectional area of the female thread transition portion with the female thread transition portion positioned between the female thread principal portion and the female thread cavity.

2. The connection of claim 1, wherein the third cross-sectional area of the male thread protrusion is about the same as the first cross-sectional area of the male thread principal portion.

3. The connection of claim 1, wherein:
the male thread comprises a semi-circular cross-sectional shape;
a radius of the male thread transition portion is smaller than a radius of the male thread principal portion; and
a radius of the male thread protrusion is larger than the radius of the male thread transition portion.

4. The connection of claim 3, wherein the radius of the male thread protrusion is about the same as the radius of the male thread principal portion.

5. The connection of claim 1, wherein:
the male thread transition portion is positioned at an end of the male thread principal portion; and
the male thread protrusion is positioned at an end of the male thread transition portion.

6. The connection of claim 1, wherein, upon make-up of the male thread with the female thread, the male thread protrusion is operable to be positioned within the female thread cavity.

7. The connection of claim 6, wherein the male thread protrusion comprises a ball and the female thread cavity comprises a socket with the ball operable to fit within the socket.

8. The connection of claim 1, wherein the male thread transition portion comprises a tapered portion.

9. The connection of claim 1, wherein an outer diameter of a threaded connection is at least twice as much as a pitch of the male thread and the female thread.

10. The connection of claim 1, wherein the pin member has only a single male thread protrusion.

11. A pin member, comprising:
a cylindrical body; and
a male thread positioned on an outer surface of the cylindrical body, the male thread comprising:
a male thread principal portion;
a male thread transition portion comprising a first cross-sectional area that is smaller than a second cross-sectional area of the male thread principal portion; and
a male thread protrusion comprising a third cross-sectional area that is larger than the first cross-sectional area of the male thread transition portion with the male thread transition portion positioned between the male thread principal portion and the male thread protrusion, wherein the cylindrical body defines a shoulder at an end thereof with the male thread protrusion positioned at the shoulder.

12. The pin member of claim 11, wherein the third cross-sectional area of the male thread protrusion is about the same as the second cross-sectional area of the male thread principal portion.

13. The pin member of claim 11, wherein:
the male thread comprises a semi-circular cross-sectional shape;
a radius of the male thread transition portion is smaller than a radius of the male thread principal portion; and
a radius of the male thread protrusion is larger than the radius of the male thread transition portion.

14. The pin member of claim 13, wherein the radius of the male thread protrusion is about the same as the radius of the male thread principal portion.

15. The pin member of claim 11, wherein:
the male thread transition portion is positioned at an end of the male thread principal portion; and
the male thread protrusion is positioned at an end of the male thread transition portion.

16. The pin member of claim 11, wherein the male thread has only a single male thread protrusion.

17. A duct of an environmental control system comprising:
a plurality of threaded connections to connect a plurality of segments, wherein each threaded connection comprises:
a pin member comprising a male thread disposed on an outer surface of a cylindrical body, the male thread comprising:
a male thread principal portion;
a male thread transition portion comprising a first cross-sectional area that is smaller than a second cross-sectional area of the male thread principal portion; and
a male thread protrusion comprising a third cross-sectional area that is larger than the first cross-sectional area of the male thread transition portion with the male thread transition portion positioned between the male thread principal portion and the male thread protrusion, wherein the cylindrical body defines a shoulder at an end thereof with the male thread protrusion positioned at the shoulder.

18. The duct of claim 17, wherein each threaded connection further comprises:
a box member comprising a female thread corresponding to the male thread, the female thread comprising:
a female thread principal portion;
a female thread transition portion comprising a fourth cross-sectional area that is smaller than a fifth cross-sectional area of the female thread principal portion; and
a female thread cavity comprising a sixth cross-sectional area that is larger than the fourth cross-sectional area of the female thread transition portion with the female thread transition portion positioned between the female thread principal portion and the female thread cavity.

19. The duct of claim 18, wherein:
the male thread protrusion comprises a ball;
the female thread cavity comprises a socket; and
upon make-up of the male thread with the female thread, the ball is operable to fit within the socket.

20. The duct of claim 17, wherein each pin member has only a single male thread protrusion.

* * * * *